Aug. 22, 1933.  S. G. TARR  1,923,240
PRESSURE GAUGE
Filed Feb. 23, 1933   2 Sheets-Sheet 1

Inventor
Steven G. Tarr

By Clarence A. O'Brien
Attorney

Aug. 22, 1933.   S. G. TARR   1,923,240
PRESSURE GAUGE
Filed Feb. 23, 1933   2 Sheets-Sheet 2
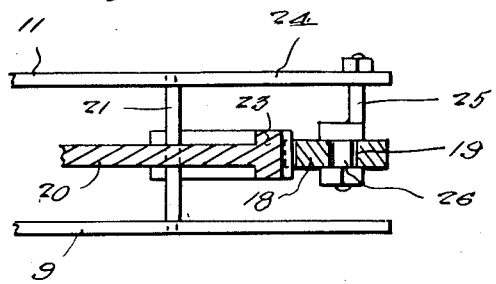
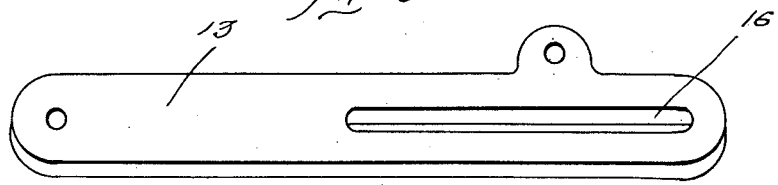
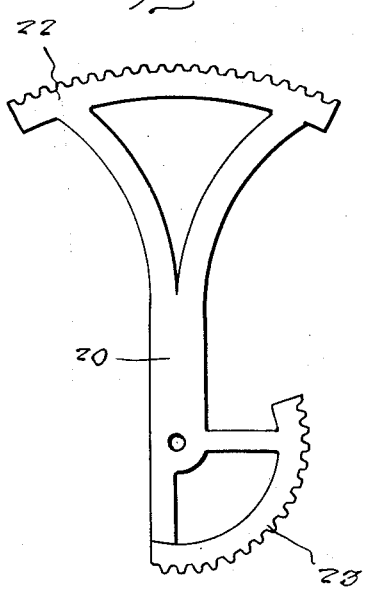
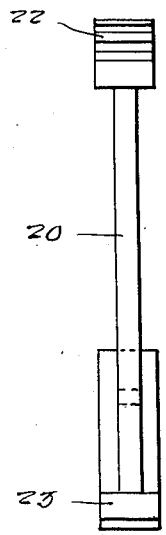
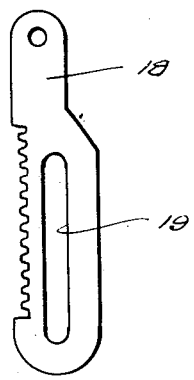
Inventor
Steven G. Tarr
By Clarence A. O'Brien
Attorney Patented Aug. 22, 1933

1,923,240

UNITED STATES PATENT OFFICE 1,923,240

PRESSURE GAUGE

Steven G. Tarr, Whiting, Ind.

Application February 23, 1933. Serial No. 658,180

5 Claims. (Cl. 73—109)

The present invention relates to new and useful improvements in pressure gauges of the Bourdon tube type and has for its primary object to provide, in a manner as hereinafter set forth, a gauge of this character embodying a novel construction, combination and arrangement of parts through the medium of which accuracy throughout the entire range of said gauge is assured.

Other objects of the invention are to provide a pressure gauge of the character described which will be simple in construction, strong, durable, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 2 is a view in horizontal section, taken substantially on the line 2—2 of Figure 1.

Figure 3 is a detail view in perspective of the pivoted arm through the medium of which the rack bar is adjustably connected to the Bourdon tube.

Figure 4 is a detail view in side elevation of the segmental gears.

Figure 5 is a view of the segmental gears, taken at right angles to Figure 4.

Figure 6 is a detail view in side elevation of the rack bar.

Figure 1:
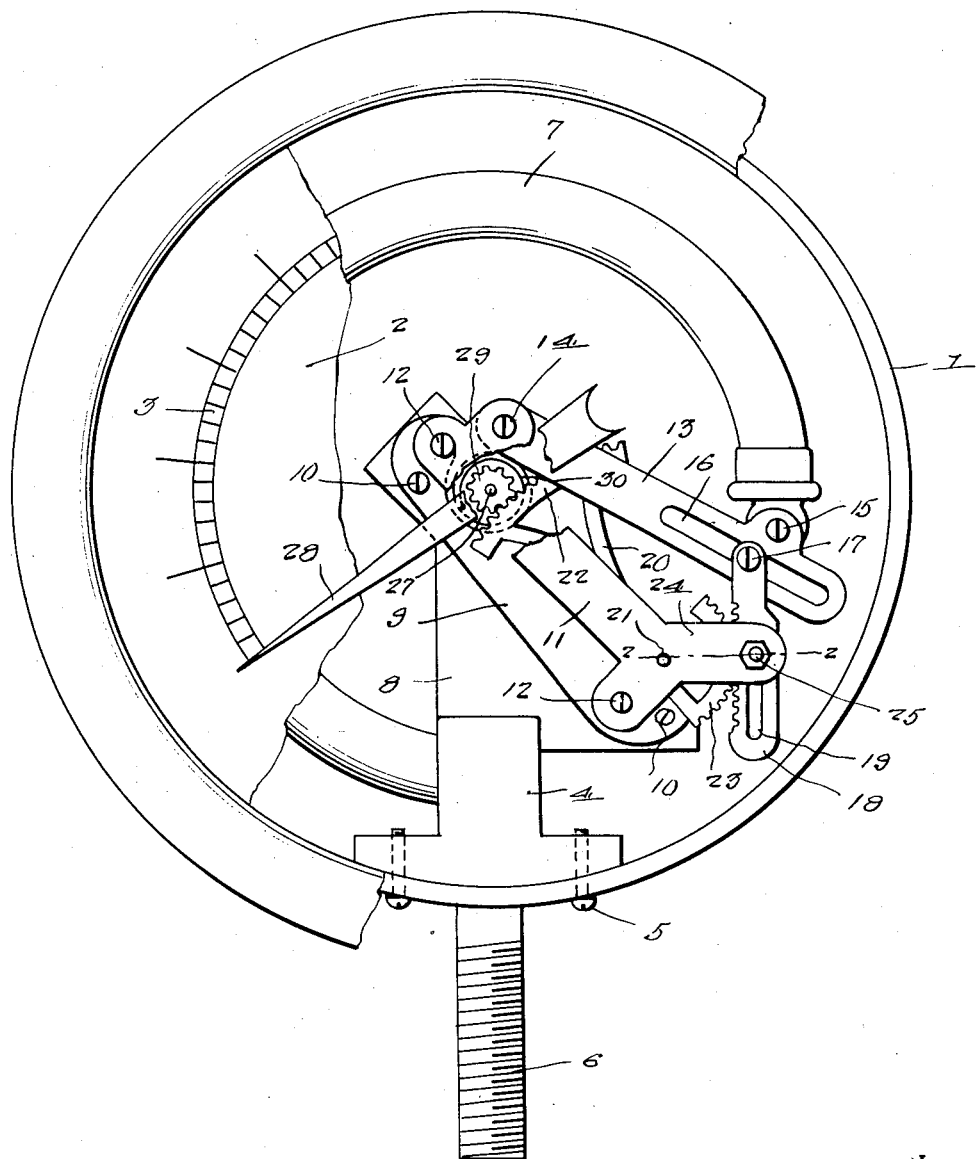
Figure 1 is a view in front elevation of a pressure gauge constructed in accordance with the present invention, with the dial broken away to expose the mechanism.

Referring now to the drawings in detail, it will be seen that the embodiment of the invention which has been illustrated comprises an annular casing 1 of suitable material, preferably metal, having mounted in its front a dial 2 provided with graduations 3. The dial 2 is, of course, to be covered with a glass.

Mounted in the lower portion of the casing 1 is a casting 4 which is secured in position by screws 5. The reference numeral 6 designates a threaded fitting which extends from the casting 4 and which provides means for connecting the gauge with the apparatus or system with which said gauge is to be used. The casting 4 is provided with a passage with which the fitting 6 communicates. Fixed at one end on the casting 4 in the casing 1 is a Bourdon tube 7, said Bourdon tube, of course, communicating with the fitting 6 through the passage in the casting 4.

Also fixed on the casting 4 in the casing 1 is a supporting member or bracket 8 upon which an elongated, inclined plate 9 is secured, as at 10. Mounted on the plate 9 in spaced relation thereto is an angular bar 11 which is mounted on spacing elements 12.

The reference numeral 13 designates an arm which is pivotally connected, as at 14, to one end portion of the bar 11. Adjacent its other end, the arm 13 is pivotally connected, as at 15, to the free end of the Bourdon tube 7. The arm 13 is provided with a longitudinal slot 16 for adjustably connecting thereto, as at 17, a rack bar 18 having a slot 19 therein. The rack bar 18 pivots on its connecting pin 17.

The reference numeral 20 designates a lever which is journaled on a shaft 21 between the members 9 and 11. Segmental gears 22 and 23 are provided on the ends of the lever 20, the position of said gears relative to each other being best seen in Figure 4 of the drawings. A leg 24 projects from one end of the member 11 and has mounted thereon a laterally projecting pin 25 (see Figure 2) which carries an offset nut equipped bolt 26 which is engaged in the slot 19 of the rack bar 18. The rack bar 18 meshes with the segmental gear 23 on the lever 20 and it will thus be seen that the offset bolt 26 will maintain the rack bar in engagement with said segmental gear 23 at all times. As may be apparent, the lever 20 is mounted for swinging movement between the members 9 and 11.

Journaled between the members 9 and 11 is a shaft 27 which extends through the dial 2 and which has fixed thereon a pointer 28. The pointer 28, of course, co-acts with the graduations 3 on the dial 2 for indicating various pressures when the gauge is in operation. Also fixed on the shaft 27 is a pinion gear 29 which is operatively engaged with the segmental gear 22 on the lever 20. It will thus be seen that the pointer 28 is operatively connected to the Bourdon tube 7 for actuation thereby. The reference numeral 30 designates a hair spring which encircles the shaft 27 and which has one end connected thereto and its other end connected to the adjacent spacer 12 for taking up play between the gears 22 and 29 and between the rack bar 18 and the gear 23.

Briefly, the operation of the gauge is as follows:—

As the Bourdon tube 7 expands and contracts, the lever 20 is actuated thereby through the medium of the arm 13, the rack bar 18 and the segmental gear 23. Actuation of the lever 20 imparts rotary movement to the pointer shaft 27 through the segmental gear 22 and the pinion gear 29. The travel of the rack bar 18 may be regulated as desired by adjusting the screw or pin 17 upon which said rack bar pivots in the slot 16 of the arm 13, thus permitting the gauge to be conveniently adjusted. The axis 14 about which the arm 13 swings is at the center of the arc described by the free end of the Bourdon tube 7 when said Bourdon tube expands and contracts.

It is believed that the many advantages of a pressure gauge constructed in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:—

1. A pressure gauge comprising a casing, a Bourdon tube operatively mounted in the casing, means for connecting the Bourdon tube with a source of actuating fluid, a supporting structure mounted in the casing, a lever pivotally mounted on the supporting structure, a gear on the lever, an arm pivotally mounted on the supporting structure, said arm connected with the free end of the Bourdon tube for actuation thereby, a rack bar pivotally mounted on the arm and operatively engaged with the gear, a pointer mounted on the casing, and means operatively connecting the pointer to the lever for actuation by said lever.

2. A pressure gauge comprising a casing, a Bourdon tube operatively mounted in the casing, means for connecting the Bourdon tube with a source of actuating fluid, a supporting structure in the casing, an arm pivotally mounted on the supporting structure and pivotally connected to the free end portion of the Bourdon tube for actuation by said Bourdon tube, a rack bar pivotally and adjustably connected to the arm, a lever mounted for swinging movement on the supporting structure, a gear on the lever engaged with the rack bar for actuation thereby, a pointer operatively mounted in the casing, and means operatively connecting the pointer to the lever for actuation thereby.

3. A pressure gauge comprising a casing, a Bourdon tube operatively mounted in the casing, means for connecting the Bourdon tube with a source of actuating fluid, a supporting structure mounted in the casing, an arm pivotally connected, at one end, to the supporting structure, means pivotally connecting the arm to the free end portion of the Bourdon tube for actuation thereby, said arm having a longitudinal slot therein, a rack bar, means engaged in the slot for pivotally and adjustably connecting the rack bar to the arm, a lever pivotally mounted on the supporting structure, a gear on the lever meshed with the rack bar for operatively connecting the lever thereto, a pointer operatively mounted in the casing, and means operatively connecting the pointer to the lever for actuation by said lever.

4. A pressure gauge comprising a casing, a Bourdon tube mounted in the casing, means for connecting the Bourdon tube with a source of actuating fluid, a supporting structure mounted in the casing, an arm pivotally mounted, at one end, on the supporting structure, means pivotally connecting the arm to the free end portion of the Bourdon tube for actuation by the said Bourdon tube, said arm having a longitudinal slot therein, a pin mounted for longitudinal adjustment in the slot, a rack bar mounted for swinging movement on the pin, said rack bar having a longitudinal slot therein, a lever mounted for swinging movement on the supporting structure, a gear on the lever engaged with the rack bar for connecting said lever to the rack bar for actuation thereby, means on the structure engaged in the second named slot for retaining the rack bar in engagement with the gear, a pointer operatively mounted in the casing, and means operatively connecting the pointer to the lever for actuation by said lever.

5. A pressure gauge comprising a casing, a casting mounted in the casing, said casting having a passage therein, a Bourdon tube mounted in the casing and connected, at one end, to the casting, said Bourdon tube communicating with the passage in the casting, a threaded fitting connected with the casting and communicating with the passage therein, a bracket mounted on the casting, spaced members mounted on the bracket, shafts, journaled between the members, a pointer fixed on one of the shafts, a pinion gear fixed on said one shaft, a lever mounted on the other shaft, segmental gears on the ends of the lever, one of the segmental gears meshing with the pinion gear, an arm pivotally connected, at one end, to one of the members, means pivotally connecting the arm to the free end of the Bourdon tube for actuation thereby, said arm having a longitudinal slot therein, a pin mounted for longitudinal adjustment in the slot, a rack bar pivotally mounted on the pin and operatively engaged with the other gear, a spring connected with said one shaft for yieldingly urging the same in one direction, and means on said one member for retaining the rack bar in engagement with said other gear.

STEVEN G. TARR.